United States Patent [19]

Kangas et al.

[11] Patent Number: 4,732,094
[45] Date of Patent: Mar. 22, 1988

[54] MECHANISM FOR STORING, SINGULATING AND PLANTING WOODY CUTTINGS

[75] Inventors: Roy J. Kangas, Dodgeville; Edsel D. Matson, Hancock, both of Mich.

[73] Assignee: The United States of America as represented by the Secretary of Agriculture, Washington, D.C.

[21] Appl. No.: 878,151

[22] Filed: Jun. 25, 1986

[51] Int. Cl.⁴ .............................................. A01C 11/00
[52] U.S. Cl. ......................................................... 111/3
[58] Field of Search ........................................ 111/1-3, 111/34, 77, 78; 221/213-216; 134/133, 134; 406/70

[56] References Cited

U.S. PATENT DOCUMENTS

| 264,493 | 9/1882 | Turner | 111/77 |
| 1,276,646 | 8/1918 | Greb | 221/215 |
| 1,748,090 | 2/1930 | Styka | 221/216 |
| 1,754,612 | 4/1980 | Cook | 134/134 |
| 1,906,899 | 5/1933 | Christiani | 221/213 |
| 2,564,879 | 8/1951 | Cook | 111/78 |
| 3,923,332 | 12/1975 | Shirouzu | 111/2 |
| 4,314,514 | 2/1982 | Binder | 111/3 |
| 4,644,880 | 2/1987 | Branch | 111/3 |

FOREIGN PATENT DOCUMENTS

| 195744 | 6/1967 | U.S.S.R. | 111/2 |
| 888840 | 12/1981 | U.S.S.R. | 111/2 |

Primary Examiner—James R. Feyrer
Attorney, Agent, or Firm—M. Howard Silverstein; John D. Fado

[57] ABSTRACT

A stick planting apparatus (10) includes a storage and singulating unit (18) and a picker/placer unit (22). Sticks (S) having at least one viable bud thereon are stored in the storage unit and are automatically singulated in that unit. Operation of the picker/placer unit is synchronized with movement of a vehicle (12) towing the units and each singulated stick is automatically removed from the storage unit and planted as the towing vehicle moves.

15 Claims, 4 Drawing Figures

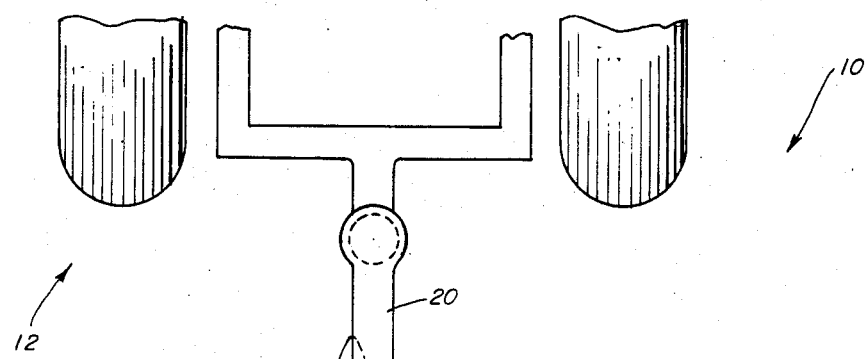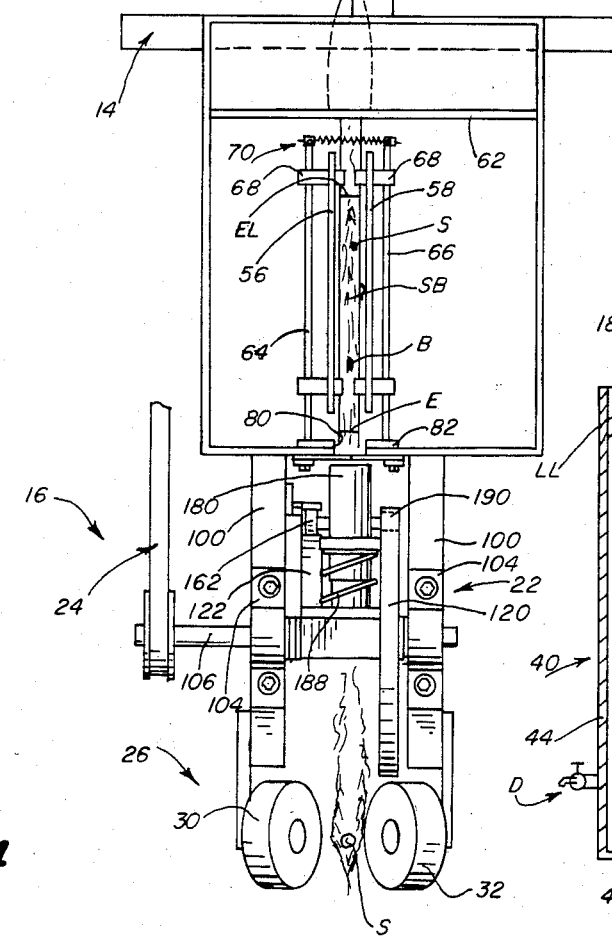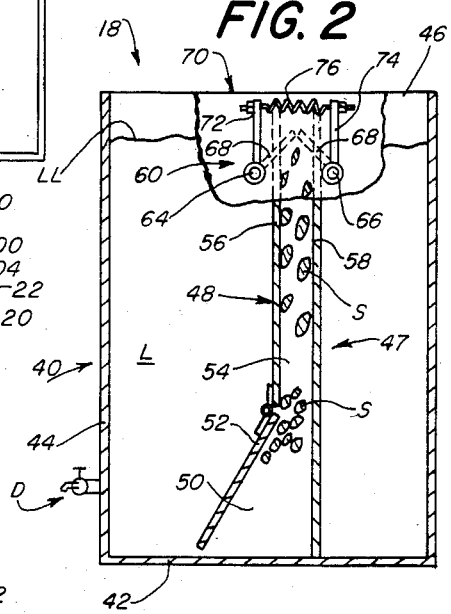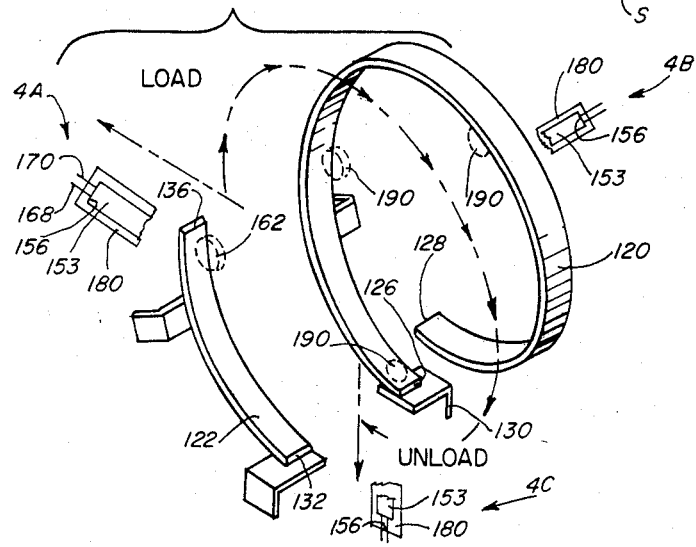

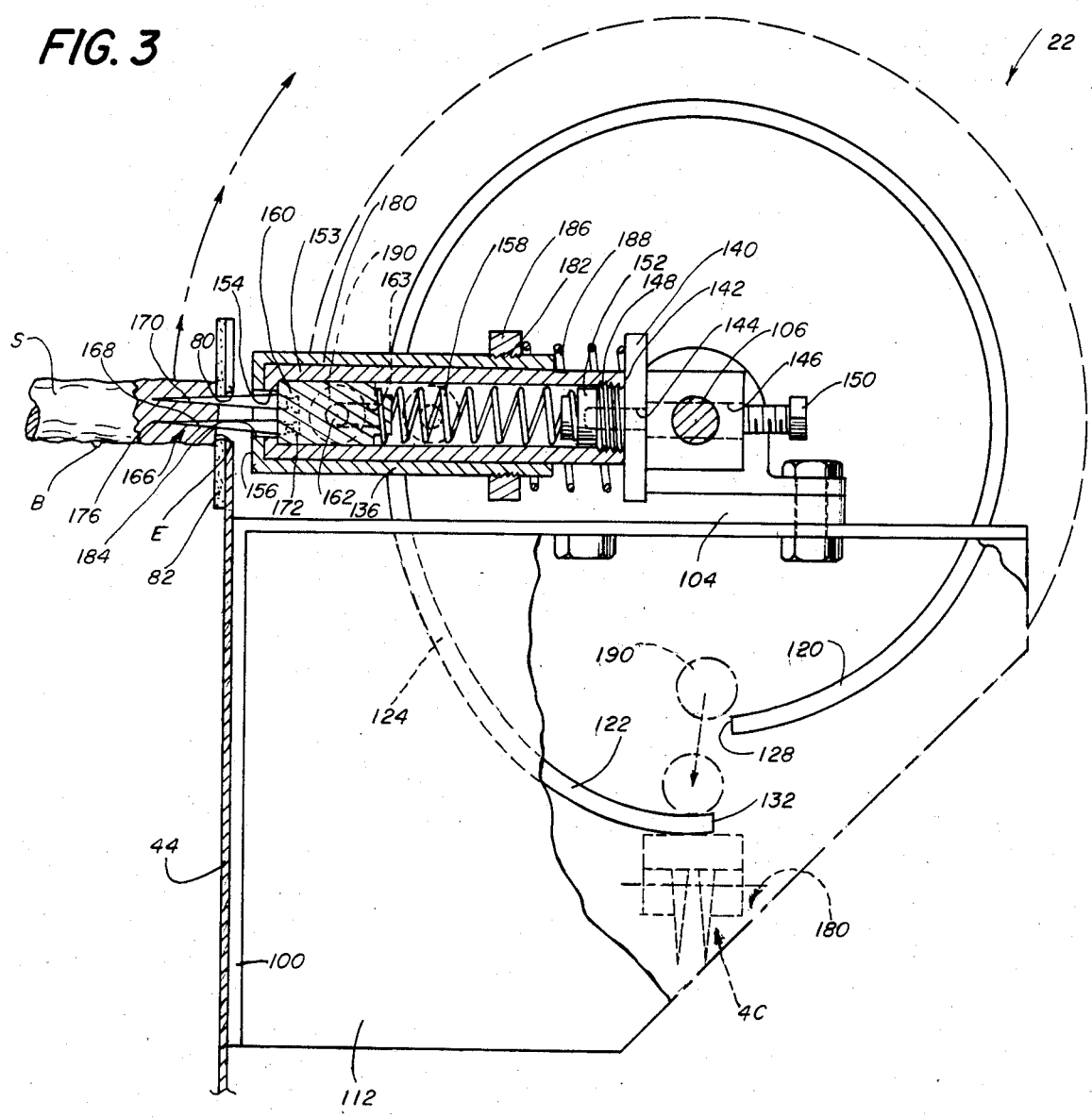

MECHANISM FOR STORING, SINGULATING AND PLANTING WOODY CUTTINGS

TECHNICAL FIELD

The present invention relates to spot planting of seedlings, and more particularly to a cuttings planter of the type used in planting closely spaced plantations of plants, such as trees. Most specifically, the invention is concerned with automating the process of planting closely spaced plantations of woody cuttings.

BACKGROUND ART

Reforestation practices have involved producing growing stock in specially prepared beds, and using this growing stock to replenish forests or the like. At or near the dormant season for the growing stock, it is removed from the beds and cut into whips, that is, pieces four to eight feet long and about one-half to three-fourth inches in diameter. The whips are stored in a controlled environment. The whips are then cut into sticks. A stick is a piece six to ten inches long and has at least one viable bud on it near one end. The bud is preferably less than one-third the length of the stick from one end of that stick. As the whips are being cut into sticks, the sticks are formed into bundles of about one hundred sticks with the buds all oriented at the same end of the bundle. The bundles are tied and wrapped in a plastic bag and kept in a storeroom having a proper environment. The sticks are stored until the proper planting season, then removed for planting.

The sticks must be kept moist during storage and while they are being transported to a planting site and up until they are actually placed in the soil. If the sticks are permitted to dry out and then placed in dry soil, they will have little chance of surviving and regenerating. It is also important to keep the sticks in an antiseptic environment during storage, during all this time.

In forestry practices, the sticks are planted on preselected spacings which has been accomplished by individual spot planting done by a forester, or the like.

While there have been a large number of reasons for such manual labor in spot planting, many attempts have been made to mechanize spot planting methods with a view to increasing the acreage which may be planted within a particular time interval while decreasing the physical labor involved. To the extent that mechanized methods and apparatus have been developed heretofore, such methods and apparatus are dangerous, of limited usefulness, or require special handling such as transferring the cutting by hand from a storage container to an insertion device which thereby reintroduces the manual labor aspects back into the planting process. The handler must make sure each stick is inserted into a planting machine at the proper orientation and position. The sticks must be held in the aforementioned storage bag to maintain them as moist as possible prior to planting, so the planter has to manipulate the sticks within the bag or during removal to make sure they remain moist but are properly oriented and positioned at insertion into the planting machine. The sticks must be removed one-by-one and placed in the planting machine. This manual operation is quite tedious and may inhibit overall operation. This manual operation becomes more disadvantageous as more planters are used. For example, if one tractor pulls four planting machines, four handlers are required. If there are four tractors, there are sixteen handlers required. In some cases, there can be as many as eighteen planting machines behind each tractor. As is evident, the sheer number of laborers is a major drawback of the prior devices. Still further, merely keeping the sticks in the storage sack does not keep them adequately moistened and protected while they are awaiting planting. Therefore, the handler must keep the remaining sticks in the bag while he is inserting other sticks into the planting machine one-by-one. It is quite awkward to accomplish this task. As a consequence, the acceptance of mechanized planting has been inhibited.

There is therefore a need to provide a means for fully automating the transfer of sticks from a storage container to insertion into the soil whereby the planting operation can be fully automated.

OBJECTS

It is a main object of the present invention to fully automate a stick planting procedure.

It is another object of the present invention to fully automate the procedure of removing sticks from storage and planting them in the soil.

It is another object of the present invention to maintain the sticks used in a stick planting procedure in a moist condition right up until the time those sticks are inserted into the soil thus increasing the probability of those sticks surviving.

It is another object of the present invention to provide a stick planting apparatus with the ability to handle sticks with a mixture of diameters.

These and other objects are accomplished by a device which automatically removes an individual stick from a multiplicity of sticks submerged in a liquid-containing storage tank and inserts and stick in the soil. The storage tank maintains the sticks moist and has means for automatically singulating the sticks whereby one stick is removed from the stored bundle of sticks and is oriented to be transferred to an automatic planter. The singulating means includes resilient fingers which are spaced apart vertically in the storage tank to separate the sticks as they float up to the surface of the liquid in the tank. In this way, the natural floating tendency of the sticks is used to separate the sticks. Because the sticks must be in position to float in a liquid containing storage tank, they cannot be loaded into a prior art placer without a manual operation, therefore, the device of the present invention includes a stick placer having an end impaling pronged tip to remove an individual stick from the tank and place that stick in the soil. Specifically, the device includes a pronged picker/placer which is reciprocated toward and rotatably away from the storage tank by a cam mechanism. Operation of the cam mechanism causes a pronged tip to impale the end of a stick, to withdraw that stick from the storage tank and then insert the stick into the soil. Continued operation of the cam mechanism withdraws the pronged tip from the stick to release that stick. The device can be towed behind a vehicle, such as a tractor or the like, and the cam mechanism can be coupled to the towing vehicle to by synchronized with the movement of that vehicle.

BRIEF DESCRIPTION OF THE DRAWING FIGURES

FIG. 1 is a top plan view of a stick planting unit which includes means for storing the sticks and automatically singulating and planting those sticks in accordance with the teaching of the present invention;

FIG. 2 is an elevation view of the storage tank;

FIG. 3 is a vertical longitudinal section of the stick picker/placer unit of the present invention; and FIG. 4 is a perspective schematic representation of the various configurations of the stick picker/placer unit as it operates to remove a stick from storage and place that removed stick in the soil.

DETAILED DESCRIPTION OF THE BEST MODE

Shown in FIG. 1 is a stick planting apparatus 10 for planting sticks S each having a viable bud B in the upper one-half to two-thirds of the stick body SB. The stick has upper end E near the bud and lower end EL which will be inserted into the soil to plant to stick. The unit 10 includes a towing vehicle 12 attached to a furrow opener 14 which prepares the soil to receive the sticks S planted by the apparatus 10. A stick storage and planting unit 16 is attached to the furrow opener to be towed by the vehicle 12. The storage and planting unit includes a storage and singulating unit 18 attached to the furrow opener by a draft bar 20, or the like, and a stick picker/placer unit 22 mounted on the storage tank to remove sticks from that storage unit 18 and insert those sticks into the soil prepared by the furrow opener. The picker/placer unit can be hand operated or connected to the towing vehicle by a suitable means 24 to be operated synchroneously with movement to that towing vehicle. A soil presser unit 26 is attached to the storage tank to press soil over and around the planted sticks and to close the furrow. The presser unit includes a pair of wheels 30 and 32 tilted upwardly and outwardly from the ground to engage the soil on each side of the furrow.

The storage and singulating unit 18 stores a multiplicity of sticks in liquid and automatically singulates those sticks to be removed from the unit one-by-one for planting. The liquid can be water or a mixture which keeps the sticks moist and otherwise treats them. The unit 18 is shown in FIG. 2, and attention is now directed thereto. The unit 18 includes a storage tank 40 having a bottom 42 and a sidewall 44 forming an open mouth 46 opposite to the bottom 42. Liquid L is held in the storage tank and has an upper level LL.

The unit 18 includes a stick singulating mechanism 47. The mechanism includes an initial separator unit 48 located in the storage tank beneath the liquid upper level LL. The initial separator unit organizes the multiplicity of sticks in a bundle and forces the sticks into an intermediate orientation to begin the singulating process. The initial separator unit 48 includes a hopper 50 which has a hinged loading door 52 located near the bottom of the storage tank for receiving a bundle of sticks. A chute 54 extends from the hopper to a position near the water upper level LL. The sticks are loaded into the underwater hopper through the doorway and float upwardly through the chute. The chute includes sides 56 and 58 which are separated by a distance to define the width dimension of the chute. The width of the chute is greater than the outer transverse dimension of a stick, but less than two times the outer transverse dimension of a stick. For cylindrical sticks, this outer transverse dimension is the outer diameter of the stick. The separation between the chute sides 56 and 58 is thus large enough to prevent jam-ups of the sticks as they float upwardly through the chute, but small enough to force the horizontally disposed sticks into vertical separation whereby the longitudinal centerline of each stick is vertically separated from the longitudinal centerlines of the sticks contacting that stick. In this way, no two sticks are in the exact same horizontal plane.

A final separator unit 60 is mounted on the storage tank to be near the liquid upper level LL. The final separator unit forces one stick into a ready position on top of all of the other sticks, and includes a mounting plate 62 affixed to the storage tank and a pair of mounting bars 64 and 66 affixed to the storage tank side wall at a location just below the liquid upper level LL. A plurality of pairs of resilient stick retaining tabs, such as tab pair 68, are mounted on the mounting bars. The tabs of each pair of tabs extend upwardly from the associated mounting bar and converge upwardly toward the other tab of that pair of tabs. An upwardly converging path is thus formed with converges from a spacing approximately equal to the width of the chute 54 to a spacing less than the outer transverse dimension of a stick. The mounting bars are positioned with respect to the liquid level LL so the angle of convergence of the cooperating tabs is adjusted so that the buoyant force exerted on the top sticks forces the stick having its longitudinal centerline in the highest vertical plane to assume a topmost position in a plane clearly separated from the planes containing the sticks located beneath it. The angle of convergence of the tabs is adjusted to prevent jaming of the upwardly moving sticks while forcing the topmost stick to move toward the center of the chute to be on top of the next lower sticks.

The tab angle of convergence is adjusted by tab adjustment unit 70 connected to the mounting bars 64 and 66 adjacent to the mounting plate 62. The adjustment unit 70 includes a pair of mounting shafts 72 and 74 each mounted at a lower end thereof to a corresponding mounting bar and each connected to a corresponding end of a tension spring 76 to be connected together by that tension spring. The spring end portions extend through spring mounting holes in the shafts, and spring tension is adjusted by moving the spring end portions through the mounting holes. Changing spring tension increases the convergence of the tabs 68 to retard the floating of the sticks, and can force the tabs of each pair into contact with each other to further retard the floating movement of the sticks as necessary to effect the final separation of a stick from the intermediately separated sticks into a ready position. The convergence of the tabs is also adjusted so that a stick in the ready position is located at or just beneath the liquid upper level LL.

A spear entrance slot 80 is defined in the storage tank sidewall to extend from the upper rim thereof downwardly to a position just beneath the liquid upper level LL so the bottom of the slot 80 is located colevel with a stick in the ready position. A gasket 82 is mounted on the storage tank wall to cover the slot 80 and prevent the liquid in the tank from leaking out of the tank. The gasket is formed of resilient material, such as rubber, and has a slot which is formed to be closed by the resilient material of the gasket. However, the slot can be forced open momentarily, but will reclose upon removal of the opening force from the slot. A liquid drain D is also mounted on the storage tank.

The stick picker/placer unit 22 is shown in FIG. 3, and attention is now directed thereto. The unit 22 includes a pair of mounting bars 100 each affixed at one end thereof to the storage tank side wall and extending outwardly therefrom. A bearing block 104 is adjustably mounted on each mounting bar to be movable toward and away from the storage tank. An axle 106 is rotatably mounted in the bearing block by suitable bearings, or the like and extends horizontally across a gap between the mounting bars. A cranking element is connected to the axle to rotate that axle about its longitudinal centerline. The cranking element can be hand operated, or coupled to the towing vehicle to be automatically rotated in synchronism therewith by the means 24.

Mounting plates 112 depend respectively from mounting bars 100 to be vertically disposed inside the gap. First and second cam surfaces 120 and 122 are respectively mounted by mounting blocks or the like on the mounting plates 112 to be vertically oriented in the gap around the axle 106. These cam surfaces are shown both in FIG. 3 and in FIG. 4. The first cam surface 120 is spiral shaped but includes a flattened entrance section 124 extending from entrance end 126 for approximately ninety degrees to a location adjacent to the bottom of the spear entrance slot 80. The first cam surface 120 then spirals for approximately two hundred seventy degrees to an exit end 128 thereof. The exit end 128 is spaced vertically and slightly horizontally from entrance end 126 to define a vertical gap and an arcuately extending space. The entrance end is reinforced by a support 130 affixed to the mounting plate 112. The second cam surface 122 is arcuate and extends for slightly less than ninety degrees from an entrance end 132 mounted on a mounting plate-affixed support to a location adjacent to the bottom of the spear entrance slot 80. The entrance end 132 of the second cam surface 122 coincides with entrance end 126 of first cam surface 120. The second cam surface 122 is slightly flattened to match the shape of the flattened entrance section 124 of the first cam surface and extends arcuately from the entrance end 132 to an exit end 136 which is thus positioned to form a small gap with the horizontal. The flattened shape of the entrance sections of cam surfaces 120 and 122 thus causes them to move radially inward of corresponding positions on an arcuately extending section so that the portion of these cam surfaces located adjacent to the bottom of the spear entrance slot is horizontally inward with respect to that horizontal location that portion would occupy if the cam surfaces were perfectly spiral.

Again principally referring to FIG. 3, a mounting plate 140 is affixed to the axle 106 and includes a boss 142 which has an internally threaded bore 144 defined therethrough to be axially aligned with a bore 146 defined transversely through the axle 106. Threads 148 are located externally on the boss 142. A threaded bolt 150 extends through the aligned bores 144 and 146 and is threadably coupled to a spring seat 152 to move that spring seat toward and away from the plate 140. An inner tubular housing 153 is threadably coupled at one end thereof to the boss external threads 148 to extend radially outward of the axle 106 and to rotate therewith in a vertical plane. A spear hole 154 is defined in top end 156 of the inner housing 153.

A spring 158 is seated on the spring seat 152 and extends axially within the inner housing and a spear mounting block 160 is attached to the spring 158 to move axially within the inner housing 153 toward and away from the spear hole 154. A cam 162 is attached to the spear mounting block and extends horizontally outwardly from that mounting block through an elongated slot 163 in the housing 153. The cam 162 engages the second cam surface 122 to be moved radially inward toward the axle 106 as the axle rotates from the cam surface entrance end 132 to exit end 136 whereby the spring 158 is compressed, and then suddenly released when the cam 162 passes the second cam surface exit end 136.

A spear 166 is mounted on the spear mounting block and includes a pair of prongs 168 and 170 extending from mounting bases 172 to stick impaling tips 176. The spear prongs are adapted to impale a stick through the end of that stick and are spaced apart a distance less than the transverse dimension of the smallest expected stick whereby both small and large sticks will be impaled and a large variety of stick sizes can be accommodated. The spear extends through the spear hold 154 and, in an impaling position after the cam 162 leaves the second cam surface 122 at the exit ends 136 thereof, into the storage tank through the spear entrance slot 80 via the reclosable slot in the gasket 82 to impale a stick which is in the ready position in the storage tank.

An outer housing 180 is tubular and telescopingly receives the inner housing. The outer housing has external threads 182 on an open end thereof and a spear hole 184 on a closed end thereof. The closed end of the outer housing is located to be adjacent to the closed end of the inner housing. A collar 186 is threadably coupled to the outer housing and a compression spring 188 is affixed at one end thereof to the collar and at the other end thereof to the mounting plate 140. A cam 190 is affixed to the outer housing to extend horizontally outwardly therefrom to contact the first cam surface 120. The cam 190 is moved radially inward toward the axle 106 as that axle rotates from the cam surface entrance end 126 to the position adjacent to the bottom of the spear entrance slot 80 whereby both the inner and the outer housings are moved toward the axle 106 into cocked positions against the forces of the springs 158 and 188 as the axle rotates and the cams 162 and 190 transverse the cam surfaces 120 and 122 along the entrance sections thereof. Both housings are fully cocked just as they are located adjacent to the bottom of the spear entrance slot 80. The outer housing 180 is released from the cocked position when the cam 190 passes the exit end 128, whereas the spear controlling inner housing 153 is released from the cocked position when the cam 162 passes the exit end 136 of the second cam surface 122. Movements of the housing are controlled by the tensions of the springs 158 and 188 which are changed by adjusting the bolt 150 and adjusting collar 186.

The operation of the stick picker/placer unit 22 is indicated schematically in FIG. 4. The axle 106 rotates clockwise and the housings are schematically shown at 4A in the nine o'clock position. In this position, the outer housing controlling cam 190 is on the first cam surface 120 and that housing 180 is thus in the cocked position, and the inner spear carrying housing cam 162 has just moved off of the second cam surface 122 so that the inner housing 153 has moved out of the cocked position radially outward away from the axle 106 into a released, stick impaling position. The spear prongs 168 and 170 are thrust through the storage tank spear entrance slot 80 and the gasket 82 by the force of the released spring 158. This thrust causes the prongs 168 and 170 to impale a stick in the ready position in the storage tank. The cam 162 is thus released from contact with the second cam surface 122 and the inner spear carrying housing 153 is in the released stick impaling position as the axle 106 continues to rotate clockwise from the nine o'clock position.

The outer housing controlling cam 190 remains in contact with the first cam surface 120 to keep that outer housing 180 in the cocked position as the axle continues to rotate clockwise past the nine o'clock position as indicated for the two o'clock position shown at 4B. Just after the axle 106 rotates past the six o'clock position, see 4C, the outer housing controlling cam 190 moves off the second cam surface exit end 128 which releases that outer housing 180 from the cocked position so that spring 188 forces the outer housing radially outward away from the axle 106 so that the outer housing closed end moves to a position adjacent to the inner housing closed end. As a matter of reference, FIG. 3 shows the picker/placer unit just prior to the FIG. 4C position. Such outer housing movement knocks the impaled stick off of the spear prongs 168 and 170 and forces the thus freed stick down into the soil. Continued clockwise rotation of the axle 106 past the six o'clock position toward the nine o'clock position causes both cams 162 and 190 to re-engage the respective cam surfaces 120 and 122 to be forced back into the cocked positions.

After the stick is plated, the presser unit forces soil over that stick.

INDUSTRIAL APPLICABILITY

While the device embodying the present invention is most useful in reforestation, it can also be used to plant other crops such as sugar cane or the like in which the plants must be placed individually in the soil. Motors and computer controls can also be used in conjunction with the means 24 to provide further versatility to the device.

We claim:

1. A method of planting woody cuttings comprising:
   storing the cutings in a liquid during a planting process;
   automatically singulating those cuttings while maintaining them moist by submerging the cuttings in the liquid, permitting the cuttings to float to the surface of the liquid, and vertically spacing the cuttings from each other as they float to the surface of the liquid; and,
   automatically removing the topmost cutting of the vertically spaced cuttings and planting that removed cutting.

2. The method defined in claim 1 wherein said cutting removing step includes impaling the cutting through the end of that cutting.

3. A means for singulating woody cuttings comprising a storage tank means for containing a liquid; a hopper means in said storage tank means for holding cuttings beneath the surface of said liquid; an initial separator means connected to said hopper means and extending to near the upper surface of said liquid, said initial separator means being wider than the woody cuttings to permit the cuttings to float to the liquid surface while forcing those cuttings to be vertically spaced from each other, and a final separator means connected to said initial separator means for orienting one of said vertically spaced cuttings on top of all the remaining vertically spaced cuttings.

4. The means defined in claim 3 wherein said initial separator means includes a chute means having a width dimension greater than the outer transverse dimension of a cutting but less than twice that cutting outer transverse dimension, and said final separator means including a plurality of converging plates which converge from a spacing corresponding to the width of said chute means to a spacing less than the cutting outer transverse dimension.

5. An apparatus for planting woody cuttings, comprising:
   tank means containing a liquid;
   storage means in said tank means for holding a multiplicity of cuttings beneath the surface of the liquid, the cuttings being floatable in the liquid;
   separator means connected to said storage means for permitting the cuttings to float toward the liquid surface while forcing the cuttings to be vertically spaced from each other; and,
   planter means connected to said tank means for removing the topmost cutting of the vertically spaced cuttings from said tank means and planting that removed cutting.

6. An apparatus for planting woody cuttings into the soil comprising:
   a storage and singulating means for storing a multiplicity of cuttings in a moist condition and for separating one cutting from the multiplicity of cuttings and placing that separated cutting into a planting-ready position;
   a picker/placer means associated with said storage and singulating means for removing said separated cutting from said storage and singulating means and placing said separated cutting into the soil; and,
   operating means connected to said picker/placer means for operating said picker/placer means;
   said picker/placer means including a spear means for impaling a cutting, means for moving said spear means between said storage and singulating means and a cutting planting position, cutting removing means for removing an impaled cutting from said spear means when said spear means is in the cutting planting position, spear controlling means for controlling movement of said spear means toward and away from said storage and singulating means, and cutting removing means control means for moving said cutting removing means toward and away from said spear means;
   said spear controlling means including an arcuate cam surface, a spear biasing means urging said spear means toward said arcuate cam surface and a cam means located on said spear means to engage said arcuate cam surface to move said spear means against the urging of said spear biasing means, said arcuate cam surface having an entrance end and an exit end; and,
   said cutting removing means control means including a spiral shaped cam surface, a housing, biasing means urging said cutting removing housing toward said spiral shaped cam surface and a cam means located on said cutting removing housing to engage said spiral shaped cam surface to move said cutting removing housing against the urging of said housing biasing means, said spiral shaped cam surface having an inlet end positioned to correspond to said arcuate cam surface entrance end and an exit end located adjacent to and spaced from said spiral shaped cam surface inlet end, said housing biasing means forcing said cutting removing housing to move across the space between said spiral shaped cam surface inlet and exit ends, and said spiral shaped cam surface inlet and exit ends being positioned adjacent to a cutting planting position.

7. An apparatus for planting woody cuttings into the soil comprising:

a storage and singulating means for storing a multiplicity of cuttings in a moist condition and for separating one cutting from the multiplicity of cuttings and placing that separated cutting into a planting-ready position;

a picker/placer means associated with said storage and singulating means for removing said separated cutting from said storage and singulating means and placing said separated cutting into the soil; and operating means connected to said picker/placer means for operating said picker/placer means;

said storage and singulating means including a storage tank means for containing liquid in which the multiplicity of cuttings is located, said cuttings being floatable in said liquid, and an initial separator for organizing the multiplicity of cuttings and guiding said cuttings to an intermediate location; and, said initial separator including a hopper portion located beneath the surface of said liquid in said storage tank means for accommodating said cuttings and a chute means extending from said hopper portion upwardly to a location near the upper surface of said liquid for separating the cuttings into a multiplicity of vertically spaced apart positions.

8. The apparatus defined in claim 1 wherein said storage and singulating means further includes a final separator means associated with said initial separator means for orienting one cutting from said intermediate location to the planting ready position.

9. The apparatus defined in claim 8 wherein said one cutting in the planting ready position is nearer the upper surface of said liquid than any of the remaining cuttings in said chute means.

10. The apparatus defined in claim 9 wherein said storage and singulating means further includes adjusting means on said storage tank for adjusting said final separator means.

11. The apparatus defined in claim 1 wherein said picker/placer means includes a spear means for impaling a cutting and means for moving said spear means between said storage and singulating means and a cutting planting position, and cutting removing means for removing an impaled cutting from said spear means when said spear means is in the cutting planting position.

12. The apparatus defined in claim 11 further including spear controlling means for controlling movement of said spear means toward and away from said storage and singulating means and cutting removing means control means for moving said cutting removing means toward and away from said spear means.

13. The apparatus defined in claim 12 wherein said spear controlling means includes an arcuate cam surface, a spear biasing means urging said spear means toward said arcuate cam surface and a cam means located on said spear means to engage said arcuate cam surface to move said spear means against the urging of said spear biasing means, said arcuate cam surface having an entrance end and an exit end.

14. The apparatus defined in claim 13 wherein said cutting removing means control means includes a spiral shaped cam surface, a housing, biasing means urging said cutting removing housing toward said spiral shaped cam surface and a cam means located on said cutting removing housing to engage said spiral shaped cam surface to move said cutting removing housing against the urging of said housing biasing means, said spiral shaped cam surface having an inlet end positioned to correspond to said arcuate cam surface entrance end and an exit end located adjacent to and spaced from said spiral shaped cam surface inlet end, said housing biasing means forcing said cutting removing housing to move across the space between said spiral shaped cam surface inlet and exit ends, and said spiral shaped cam surface inlet and exit ends being positioned adjacent to a cutting planting position.

15. The apparatus defined in claim 12 wherein said spear means includes means for impaling cuttings having a large variation in sizes.

* * * * *